United States Patent
Ohr et al.

(10) Patent No.: US 9,556,912 B2
(45) Date of Patent: Jan. 31, 2017

(54) OIL DEFLECTOR AND OIL DEFLECTOR-BEARING ASSEMBLY

(71) Applicant: Schaeffler Technologies AG & Co. KG, Herzogenaurach (DE)

(72) Inventors: Carsten Ohr, Charlotte, NC (US); Marion Jack Ince, Mount Holly, NC (US); George Spencer, Halifax, VA (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/805,927

(22) Filed: Jul. 22, 2015

(65) Prior Publication Data

US 2016/0040720 A1 Feb. 11, 2016

Related U.S. Application Data

(60) Provisional application No. 62/035,782, filed on Aug. 11, 2014.

(51) Int. Cl.
*F16C 19/00* (2006.01)
*F16C 33/66* (2006.01)

(52) U.S. Cl.
CPC ....... *F16C 33/6681* (2013.01); *F16C 33/6666* (2013.01)

(58) Field of Classification Search
CPC .............. F16C 33/6637; F16C 33/6659; F16C 33/6666; F16C 33/6681
See application file for complete search history.

(56) References Cited

U.S. PATENT DOCUMENTS

| | | | |
|---|---|---|---|
| 4,932,500 A * | 6/1990 | Smith | F16C 19/163 384/466 |
| 6,382,836 B1 * | 5/2002 | Shoda | F16C 19/36 384/447 |
| 8,123,412 B2 * | 2/2012 | Koci | F16C 33/3806 384/470 |
| 2009/0208151 A1 * | 8/2009 | Dobek | F16C 33/6659 384/91 |

* cited by examiner

*Primary Examiner* — James Pilkington
(74) *Attorney, Agent, or Firm* — Volpe and Koenig, P.C.

(57) ABSTRACT

An oil deflector is provided comprising a ring-shaped body having a first face and an axial projection extending from the first face. The projection has a radially inwardly facing deflection surface. An oil deflector-bearing assembly includes a bearing, the oil deflector, and a carrier with a plurality of radial oil grooves. The second face of the oil deflector is arranged adjacent to an axial face of the bearing and the carrier is arranged adjacent to the oil deflector so that the projection is at least partially received in one of the oil grooves for deflecting an axial flow of oil.

10 Claims, 2 Drawing Sheets

US 9,556,912 B2

OIL DEFLECTOR AND OIL DEFLECTOR-BEARING ASSEMBLY

INCORPORATION BY REFERENCE

The following document is incorporated herein by reference as if fully set forth: U.S. Provisional Patent Application No. 62/035,782 filed Aug. 11, 2014.

FIELD OF INVENTION

The present invention relates to enhanced oil distribution within a drawn cup bearing.

BACKGROUND

In some bearing systems, it is desirable to lubricate both a drawn cup bearing and a coaxially aligned carrier with the same axial oil flow. For example, in some automotive transmissions an axial flow is partially diverted to a radial flow to a carrier for a clutch plate by an end of a bearing-supported shaft. It has been observed that the oil flow may be non-uniformly diverted, with a disproportionally large volume of oil, in some cases all of the flow, directed to the carrier with the bearing receiving an insufficient amount of oil.

Accordingly, a need exists for a bearing system with improved oil flow.

SUMMARY

An oil deflector is provided comprising a ring-shaped body having a first face, and an axial projection extending from the first face, wherein the projection has a radially inwardly facing deflection surface.

In one embodiment, an oil deflector-bearing assembly comprises a bearing, a ring-shaped oil deflector having a first face with an axial projection extending from the first face and a second face, and a carrier comprising a plurality of radial oil grooves. The second face of the oil deflector is disposed adjacent to an axial face of the bearing and the carrier is disposed adjacent to the oil deflector so that the projection is at least partially received in one of the oil grooves for deflecting an axial flow of oil.

Figure 1:
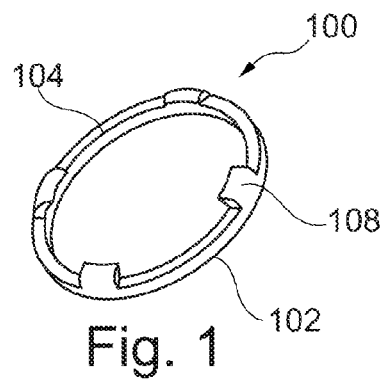
FIG. 1 is a top perspective view of an oil deflector ring in accordance with an embodiment of the present invention.
Figure 2:
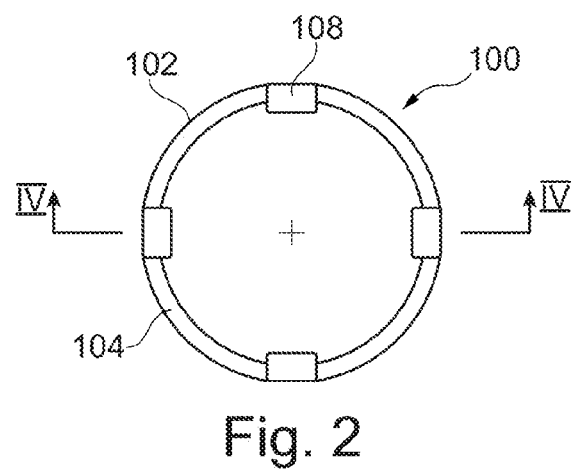
FIG. 2 is a top view of the oil deflector of FIG. 1.
Figure 3:
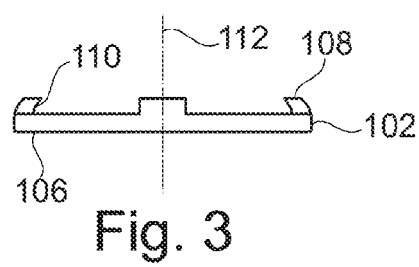
FIG. 3 is a side view of the oil deflector ring of FIG. 2.
Figure 4:
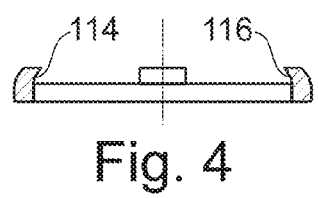
FIG. 4 is a cross sectional view of the oil deflector ring of FIG. 2 taken along line IV-IV.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

DETAILED DESCRIPTION

Certain terminology is used in the following description for convenience only and is not limiting. The words "front," "rear," "upper" and "lower" designate directions in the drawings to which reference is made. The words "radially inwardly" and "radially outwardly" refer to directions radially toward and away from an axis of the part being referenced. "Axially" refers to a direction along the axis of a shaft or other part. The terminology includes the words specifically noted above, derivatives thereof and words of similar import.

FIG. 1 depicts one embodiment of an oil deflection ring 100. As illustrated in FIGS. 1-4, the oil deflection ring 100 includes a body 102 in the shape of a ring with a front face 104 and an opposite rear face 106. Both faces 104, 106 are generally planar and parallel.

One or more projections 108 (four shown) extend from the front face 104 in an axial direction and are equally spaced around the circumference of the body 102, although the projections need not be equally spaced. The projections 108 have a radially inwardly facing deflection surface 110. The deflection surface 110 has an inclined portion 114 inclined radially inwardly toward the central axis 112. The inclined portion 114 includes a concave curved surface 116 as illustrated in the figures, but is not necessarily a concave surface.

The body 102 may be formed from a polymeric material such as a polyamide, for example polyamide 66 (PA66) and may be formed by known methods, such as injection molding. Other polymeric materials with similar properties may be used. In some embodiments, the body 102 may be formed from a metal, such as steel, or a metal alloy, such as brass. Metallic bodies may be formed by known material removal operations such as machining, or cold forming operations, for example by stamping.

Figure 5:
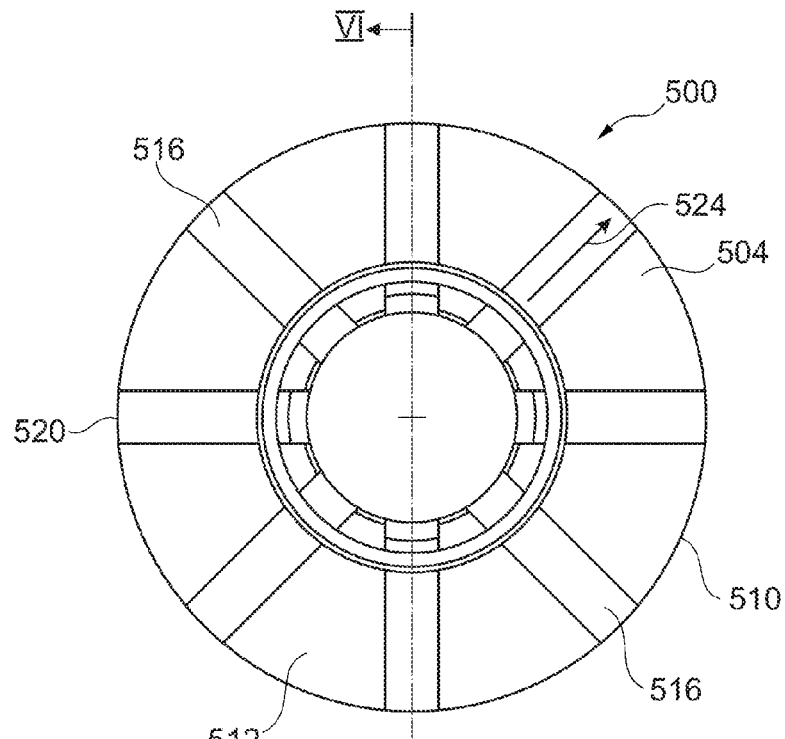
FIG. 5 is a plan view of an oil deflector assembly in accordance with an embodiment of the present invention.

FIG. 5 depicts an oil deflector-bearing assembly 500. The assembly 500 includes a bearing 502, a carrier 504, and an oil deflector 100 (partially visible in FIG. 5; shown in FIG. 6.)

Figure 6:
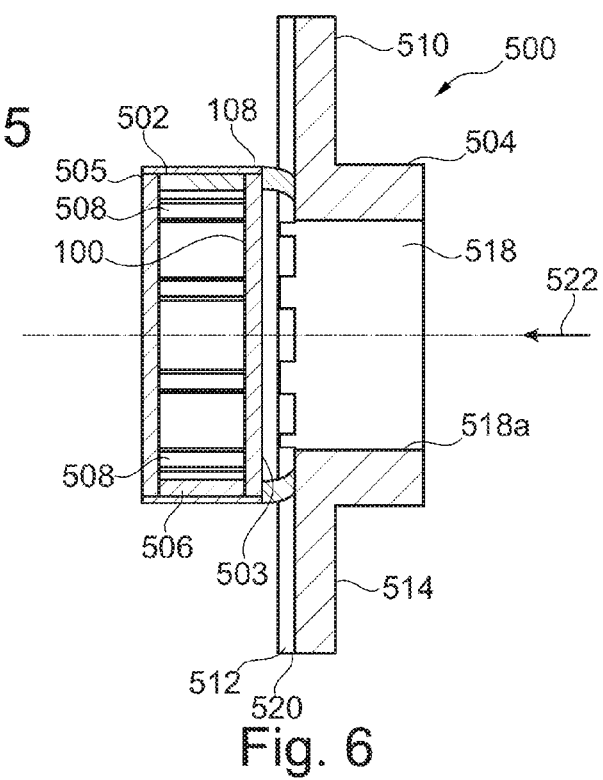
FIG. 6 is a cross sectional view of the oil deflector assembly of FIG. 5 taken along line VI-VI.

In the non-limiting embodiment illustrated in FIGS. 5 and 6, the bearing 502 is a drawn cup bearing including a thin-walled drawn outer ring 506 and needle rollers 508. In other embodiments, the bearing may be any other type of bearing that that supports a shaft for rotation and may benefit from improved oil flow during use. The bearing 502 has an axial face 503 and an opposite axial face 505.

A carrier 504, for example a carrier for a clutch plate, includes a radially extending disk 510 that has a first side 512 and a second side 514, and an axial through bore 518 defined by wall 518a. The first side 512 includes a plurality of radial oil grooves 516 that extend from the outer peripheral edge 520 to the bore 518. Eight linear radial oil grooves 516 are shown symmetrically arranged around the bore 518 with equal angular displacement between adjacent grooves 516, although other arrangements of oil grooves may be used, including different positioning or shape of the grooves and different numbers of grooves.

The carrier 504 is coaxially aligned with the bearing 502 so that the first side 512 is adjacent to an axial face of the bearing 502 and spaced apart from the axial face of the bearing. The carrier 504 and the bearing 502 are coaxially arranged to accept a shaft (not shown) through central passage of the bearing and the through bore 518 of the carrier 504.

An oil deflector 100 is disposed between the bearing 502 and the carrier 504 so that at least one of the projections 108 is received within an oil groove 516 of the carrier 504. So configured, the rear face 106 is adjacent to, and may be in an abutting relationship with, the axial face 503 of the bearing.

In operation, an axial oil supply is provided, in the form of an axial oil flow represented by arrow 522 (FIG. 6), to the oil deflector 500 to provide lubrication to the bearing 502 and to the oil grooves 512 in the carrier 504. The axial oil flow is divert at least partially by the shaft (not shown) journaled in the bearing 502 and becomes primarily a radial oil flow in the oil grooves represented by arrow 524.

The oil deflection ring 100 may beneficially redirect some of the radial flow to a secondary axial flow. The projection 108 disposed in a groove 116 obstructs at least some of the radial flow 524 in the oil grooves 116 in which it is disposed. The deflection surface 110 deflects some of the obstructed radial oil flow and redirects the radial flow to a secondary axial flow in the same general direction as the axial oil supply 522. The secondary axial flow may direct an oil flow to the bearing for enhanced bearing performance, for example decreased bearing wear and noise.

The amount of oil redirected by the oil deflection ring 100 may be proportional to the number of the projections 108, the configuration of the projections 108, and the shape of the deflection surface 110. Thus different configurations of the oil deflection ring may result it different secondary oil flows to the bearing. The secondary oil flows may be optimized to enhance bearing performance under specific operating conditions.

Thus an oil deflector and an oil deflector-bearing assembly comprising the oil deflector are provided herein.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An oil deflector-bearing assembly comprising:
   a bearing;
   a ring-shaped oil deflector having a first face with an axial projection extending from the first face and an opposite second face; and
   a carrier comprising a plurality of radial oil grooves, wherein the second face of the oil deflector is disposed adjacent to an axial face of the bearing and the carrier is disposed adjacent to the oil deflector so that the projection is at least partially received in one of the oil grooves for deflecting an axial flow of oil.

2. The assembly of claim 1, wherein the deflector is formed from a polymeric material.

3. The assembly of claim 2, wherein the polymeric material is a polyamide.

4. The assembly of claim 1, wherein the deflector is formed from a metal.

5. The assembly of claim 1, wherein the bearing, oil deflector, and the carrier are concentrically arranged.

6. The assembly of claim 1, wherein the projection has a radially inwardly facing deflection surface.

7. The assembly of claim 6, wherein the deflection surface includes a radially inwardly inclined portion.

8. The assembly of claim 6, wherein the deflection surface includes a radially inwardly facing curved surface.

9. The assembly of claim 1, wherein the deflector is formed from a synthetic resin.

10. The assembly of claim 1, wherein the bearing is a deep drawn cup bearing.

* * * * *